United States Patent [19]

Blanc

[11] Patent Number: 5,230,394

[45] Date of Patent: Jul. 27, 1993

[54] DEVICE FOR CONVEYING PRODUCTS, IN PARTICULAR FRUIT, ADAPTED TO SORT THESE PRODUCTS AS A FUNCTION OF PREDETERMINED SELECTION CRITERIA

[75] Inventor: Phillippe Blanc, Montauban, France

[73] Assignee: Material pour l'Arboriculture Fruitiere, Montauban, France

[21] Appl. No.: 796,843

[22] Filed: Nov. 25, 1991

[30] Foreign Application Priority Data

Dec. 19, 1990 [FR] France .................. 90 16519

[51] Int. Cl.⁵ .................. G01G 19/00; G01G 19/52; B07C 5/16
[52] U.S. Cl. .................. 177/145; 177/50; 209/592
[58] Field of Search .................. 177/50, 145; 209/592, 209/593

[56] References Cited

U.S. PATENT DOCUMENTS 4,106,628 8/1978 Warkentin et al. ............. 177/145 X
4,569,434 2/1986 Horii et al. .
4,586,613 5/1986 Horii .................. 209/592 X

FOREIGN PATENT DOCUMENTS

0230583 8/1987 European Pat. Off. .
0273313 7/1988 European Pat. Off. .
WO89/08510 9/1989 PCT Int'l Appl. .
2143491 2/1985 United Kingdom .

*Primary Examiner*—George H. Miller, Jr.
*Attorney, Agent, or Firm*—William R. Hinds

[57] ABSTRACT

The invention relates to a device for conveying products, in particular fruit, adapted to sort automatically these products. This device comprises a plurality of chassis (3) distributed along a conveyor (1) and each supporting a carriage (8) bearing two rollers (19) mounted on an axis (6) of this chassis so as to be able to oscillate vertically and tilt laterally. This device further comprises weighing means comprising slideways disposed in the alignment of support shoes (16, 18) with which each carriage (8) is provided, these slideways being provided with end ramps arranged such that the carriages are driven in a floating manner along the slideways. This device further comprises separation means adapted to carry out, at the loading zone of the conveyor, an ordered arrangement of the products allowing each of them to be disposed on a carriage.

12 Claims, 7 Drawing Sheets

DEVICE FOR CONVEYING PRODUCTS, IN PARTICULAR FRUIT, ADAPTED TO SORT THESE PRODUCTS AS A FUNCTION OF PREDETERMINED SELECTION CRITERIA

The invention relates to a device for conveying products, in particular fruit, adapted to sort these products as a function of predetermined selection criteria.

Conveyor devices of this type are currently used for the sorting of fruit and are disclosed in particular in U.S. Pat. Nos. 4,106,628 and 4,569,434 and British Patent Specifications 2 143 491 and 2 126 356. They comprise a conveyor along which there are distributed supports for the fruit, control stations adapted to determine the weight and colour of this fruit and discharge zones for the fruit where the latter are selectively discharged as a function of predetermined sorting parameters.

Despite major advantages, these devices have three main drawbacks which detract from their operation and reduce their efficiency. In the first place, they do not make it possible to weigh the fruit when it is loaded on its support. The filling level of the conveyors, supplied for instance via a conveyor belt, is also relatively low and generally approximately 50%. Lastly, none of these devices make it possible to ensure that the fruit is effectively separated on the conveyor especially when this fruit is of different shape and size. For these reasons, the fruit is in practice supplied in individual sequence in small numbers to the conveyor so as to increase the chance of achieving the separation of the fruit at the head of the conveyor. This method of operation substantially reduces the efficiency of these conveyor devices.

The first of the above-mentioned drawbacks of known conveyor devices has been partially resolved by the device disclosed in European Patent 0 273 313. In this device, the fruit is borne by two rollers mounted to oscillate vertically in vertical slideways which makes it possible to weigh the fruit directly, the tare weight being formed by the weight of the rollers. However, the accuracy of weighing is very relative as it is subject to the slideways being perfectly vertical and the absence of friction during the vertical movement of the rollers. As regards this latter point in particular, the fruit resting on two rollers necessarily generates forces of friction which themselves systematically distort the measurements. Moreover, this conveyor device does not resolve the drawbacks relating to the low filling level and the separation of the fruit.

The present invention aims to remedy the drawbacks of known conveyor devices and has as its initial object to provide a conveyor device making it possible accurately to ascertain the individual weights of the products borne by the rollers of the conveyor.

The second object of the invention is to provide a conveyor device allowing the separation of the flow of products so as to obtain a continuous line of these products on the conveyor.

A further object of the invention is to provide a conveyor device comprising discharge means for the products facilitating the dropping of these products whatever their shape.

For this purpose, the invention relates to a conveyor device for products, in particular fruit, adapted to sort these products as a function of predetermined selection criteria, of the type comprising:

a conveyor for transporting the products provided with a loading zone for these products;

a plurality of rollers rotating freely about their axes, distributed along the conveyor and disposed transversely with respect to the direction of movement of the conveyor so that two successive rollers bound a housing for a product between one another;

support means for the rollers adapted to allow oscillation in a vertical plane and lateral tilting of these rollers;

weighing means adapted to allow the weight of the products supported by the rollers to be ascertained;

tilting means adapted selectively to cause the tilting of two successive rollers so as to discharge the product disposed between these rollers.

In accordance with the invention, this conveyor device is characterized in that:

the support means for the rollers comprise:
a plurality of chassis distributed along the conveyor and comprising a horizontal axis extending parallel to the conveyor,
supported by each chassis, a carriage bearing two rollers bounding a housing for a product between one another, each of these carriages:
being mounted on the axis of a chassis so as to be able to oscillate vertically and tilt laterally with respect to this chassis,
comprising support shoes defining at least one horizontal sliding plane;

the weighing means comprise slideways each disposed in the alignment of a carriage support shoe, these slideways being provided with an end ramp adapted to cause an upward movement of the carriages with respect to their chassis, and weighing zones for the carriages;

separation means are adapted to carry out, at the product loading zone, an ordered arrangement of the products making it possible to dispose each of them on a carriage.

In accordance with the invention, the products are thus borne individually on the carriages provided with support shoes which allow sliding on the weighing slideways such that these carriages are moved in a floating manner. This arrangement allows accurate weighing of the carriage/rollers/product assembly which is in no way affected by the traction forces or other parasitic forces in respect of the movement mechanics. Moreover, this design allows for sufficient time to weight each carriage and carry out an automatic zero setting of the weighing means between two carriages.

According to a preferred embodiment of the product weighing means:

each carriage comprises four support shoes distributed laterally and longitudinally under this carriage, the shoes being offset transversely with respect to one another, the weighing means comprise four slideways each disposed in the alignment of a shoe, these slideways being provided with weighing zones disposed so as simultaneously to support the support shoes.

According to a further characteristic feature of the invention, the conveyor extends, at its loading zone, in the form of an ascending inclined ramp and the separation means comprise:

for each carriage, an intermediate roll parallel to the rollers and disposed so as to extend between the pairs of rollers of two successive carriages, means for driving the rollers in rotation disposed along the loading zone and adapted to drive these rollers in rotation in the direction opposite to the direction of movement of the conveyor with a linear speed of rotation greater than that of the conveyor.

the rollers are thus driven in rotation so that the products are themselves caused to rotate and naturally seek the stable spaces between two rollers, urging surplus products backwards so that they have to find a free space on the following carriages. Moreover, the intermediate roll makes it possible to prevent the creation of a stable space between the rollers of two successive carriages. Any product situated in this zone and caused to rotate cannot remain there in a stable manner and must find a centred space on the following carriage. This separation process is also underscored by the ascending inclination of the conveyor in its loading zone.

According to a further characteristic feature of the invention:

each chassis comprises a plate adapted to be secured laterally to the conveyor and a substantially horizontal support arm extending at right angles to this plate and bearing a horizontal axis parallel to the conveyor, which axis comprises a tappet at each end, each carriage comprises a plate having a recessed rear surface forming an upper rim via which it bears on the plate of the chassis, and two substantially horizontal crossbars extending at right angles to this plate, below each of which there is disposed an oblong window with a major vertical axis adapted to house a tappet.

This arrangement advantageously makes it possible to provide a double capacity conveyor device comprising two sets of chassis secured facing one another on either side of the conveyor.

The tilting means preferably also comprise:

a cam provided with an access ramp and disposed parallel with respect to the conveyor, for each carriage, a lug projecting below this carriage and arranged to pass laterally along the cam, switching means adapted to divert the path of the lugs of the carriages and bring them to the access ramp of the cam.

These switching preferably comprise: a lever provided with an upper surface combined with the access ramp of the cam and means for pivoting this lever between a position in which it is spaced from the cam so as to allow the passage of the lugs of the carriages and a position in which it is coupled to the cam in the path of these lugs.

In addition, in accordance with a further characteristic feature of the invention, these tilting means advantageously comprise a support member disposed parallel to the cam so that the end of the rollers bears on this member when the carriages are tilted by the cam.

A support member of this type causes a rotation of the rollers and thus facilitates the dropping of products whatever their shape.

The invention also relates as such to a conveyor device adapted to ensure the separation of the flow of products so as to obtain a continuous line of products and comprising:

a conveyor for transporting the products provided with a loading zone for these products, a plurality of rollers rotating freely about their axes distributed along the conveyor and disposed transversely with respect to the direction of movement of the conveyor so that two successive rollers bound a housing for a product between one another.

According to the invention, this conveyor device is characterized in that the conveyor extends, at its loading zone, in the form of an ascending inclined ramp and in that it comprises means for separating the products comprising:

between each pair of rollers, an intermediate roll parallel to these rollers and disposed so as to extend between these pairs of rollers, means for driving the rollers in rotation disposed along the loading zone and adapted to drive these rollers in rotation in the direction opposite to the direction of movement of the conveyor, with linear speed of rotation greater than that of the conveyor.

This conveyor device makes it possible, on the one hand, to ensure the systematic separation of the products and, on the other hand, to obtain a filling level of the conveyor of 90 to 100%.

Further characteristic features, objects and advantages of the invention are set out in the following detailed description made with reference to the accompanying drawings which show a preferred embodiment thereof by way of non-limiting example. In these drawings, which are an integral part of this description.

The device shown in the Figures forms a conveyor device adapted to sort products such as fruit or vegetables as a function of predetermined selection criteria such as the weight and colour of these products.

This device comprises a conveyor comprising a horizontal active portion along which the products are transported by an endless chain 2 supported, in this active portion, by a profiled section 1.

This conveyor is provided with a plurality of chassis 3 distributed uniformly along the chain and secured two by two facing one another on either side of this chain.

Each of the chassis 3 comprises, in the first place, a plate 4 whose rear surface is recessed so as laterally to cap one of the flanges of a link 2a of the chain 2. The plates 4 and the flanges of the links 2a are drilled with an aperture allowing two chassis to be secured facing one another on the chain 2 by means of a screw and nut (not shown).

The chassis 3 further comprise a substantially horizontal support arm 5 extending at right angles to the plate 4. These support arms 5 have one end 5a curved downwards and extended by a horizontal axis 6 extending at right angles to the arm and consequently parallel to the conveyor. This axis 6 is also provided with a tappet 7 at each end.

Each of these chassis 3 acts as a support for a carriage 8 adapted to be able to oscillate vertically and tilt laterally with respect to the chassis.

These carriages 8 firstly comprise a plate 9 having a recessed rear surface forming an upper rim 9a via which it bears on the plate 4 of a chassis. This plate 9 is also provided with a window 10 through which the arm 5 of the chassis 3 extends.

Each carriage 8 also comprises, on either side of the window 10, two horizontal crossbars 11 extending at right angles with respect to the plate 9. Towards its free end each of these crossbars 11 comprises two spaced vertical flanges 12a, 12b extending below these crossbars. These two flanges 12a, 12b, connected at their lower ends by a horizontal web 12c, form an oblong housing 13 with a major vertical axis in which the tappets 7 of the chassis are inserted by simple elastic deformation of the crossbars 11.

The carriages 8 also comprise a lug 14 in the form of a U-shaped vertical plate parallel to the plate 9 and connecting the bottom surfaces of the crossbars 11.

These carriages 8 are also provided with four support shoes 15, 16, 17, 18 offset transversely with respect to one another. Two of these shoes are formed by lugs extending in the lower prolongation of one of the flanges 12a, 12b and forming a first horizontal sliding plane: the first shoe 15 forms the lower prolongation of the flange 12a extending below one of the crossbars 11 and the second shoe 16 forms the lower prolongation of the flange 12b extending below the other crossbar 11. These two shoes 15, 16 are thus offset transversely by a distance equivalent to the width of the housing 13.

The other two shoes 17, 18 also each extend below a crossbar 11, but on the side of the plate 9, and define a second horizontal sliding plane offset upwardly with respect to the first plane. One of these shoes 18 is formed by a lug extending in the lower prolongation of the plate 9. The other shoe 17 is formed by a lug offset transversely with respect to the shoe 18 by a distance identical to that separating the first two shoes 15, 16.

Each of the carriages 8 bears two horizontal rollers 19 each disposed substantially above a crossbar 11 and mounted freely to rotate about an axis extending at right angles to the plate. Each of these rollers 19 has a concave biconical shape and comprises, at its end opposite to the plate 9, a section 19a of smaller width and cylindrical shape.

The carriages 18 lastly comprise an intermediate roll 20 formed by a horizontal cylindrical finger mounted freely to rotate about an axis extending at right angles to the plate 9.

This roll 20 is disposed so as to extend into the space between the pairs of rollers 19 of two successive carriages. It is disposed such that its upper generatrix is disposed in an intermediate horizontal plane with respect to the horizontal planes passing through the end bearing points of the rollers 19.

This chassis 3-carriage 8 assembly is thus arranged such that the carriage 8 may, on the one hand, oscillate vertically with respect to the chassis as a result of the oblong shape of the housings 13 and, on the other hand, tilt laterally by rotation about the axis 6 between two positions: a transport position in which the upper rim 9a of the plate 9 rests on the plate 4 and in which the axes of the rollers 19 are horizontal and a position in which the lug 14 abuts at the bottom below the arm 5 and in which the axes of the rollers 19 are inclined.

The conveyor device also comprises a loading zone for the products provided towards one of the ends of the conveyor and to which the products are supplied by any known means such as conveyor belts or fruit floating on water.

Figure 4:
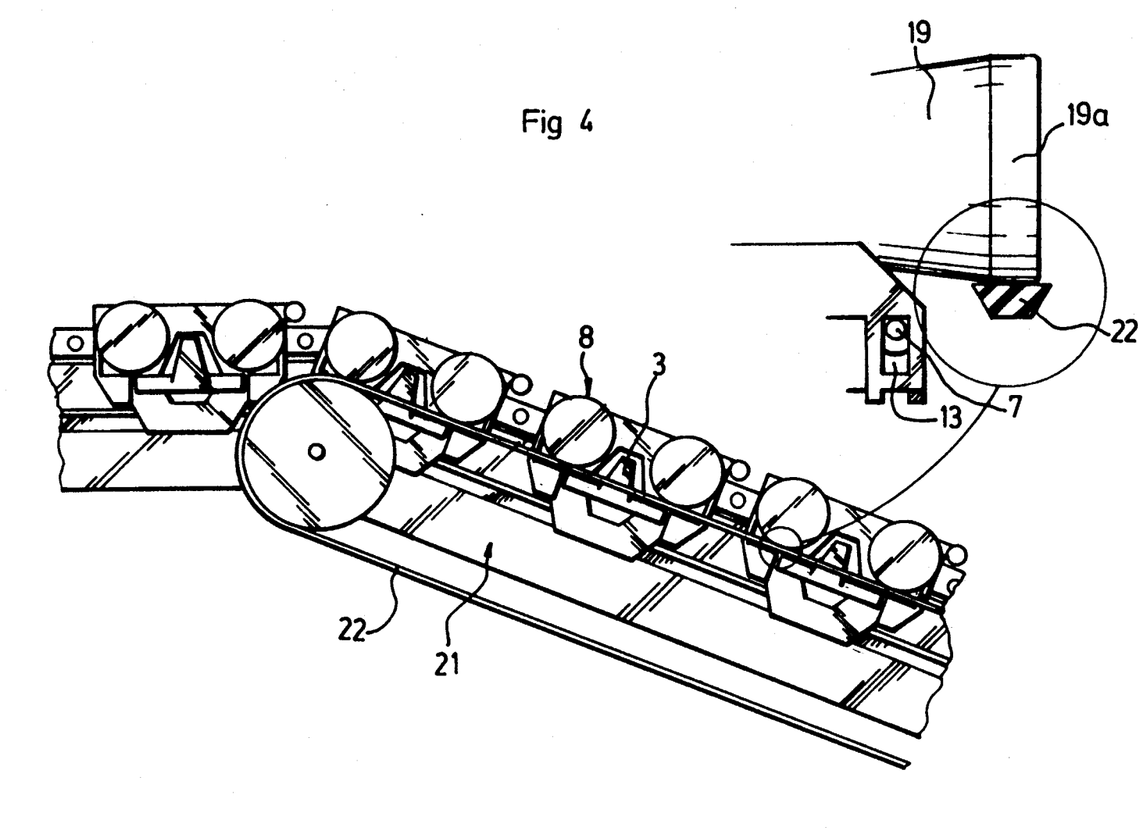
FIG. 4 is a partial side view of the loading zone of the conveyor device with a detail shown on an enlarged scale.

As shown in FIG. 4, at this loading zone the conveyor extends in the form of an ascending inclined ramp 21 forming a plane of 13 degrees with respect to horizontal.

Moreover, an endless trapezoidal belt is disposed along this ramp 21 and in parallel with the conveyor and arranged such that the rollers 19 bear on this belt via their cylindrical end sections 19a. This belt 22 which is driven in the direction opposite to the direction of movement of the conveyor and at a linear speed greater than that of the conveyor causes a rotation of the rollers 19 and therefore of the products resting on these rollers. The products are consequently caused to move naturally into the stable spaces between the rollers 19 of the carriages 8, the intermediate rolls 20 preventing, moreover, products from remaining in a stable position between two carriages.

The conveyor device further comprises a weighing station disposed downstream of the loading zone and adapted to weigh each carriage 19.

Figure 5:
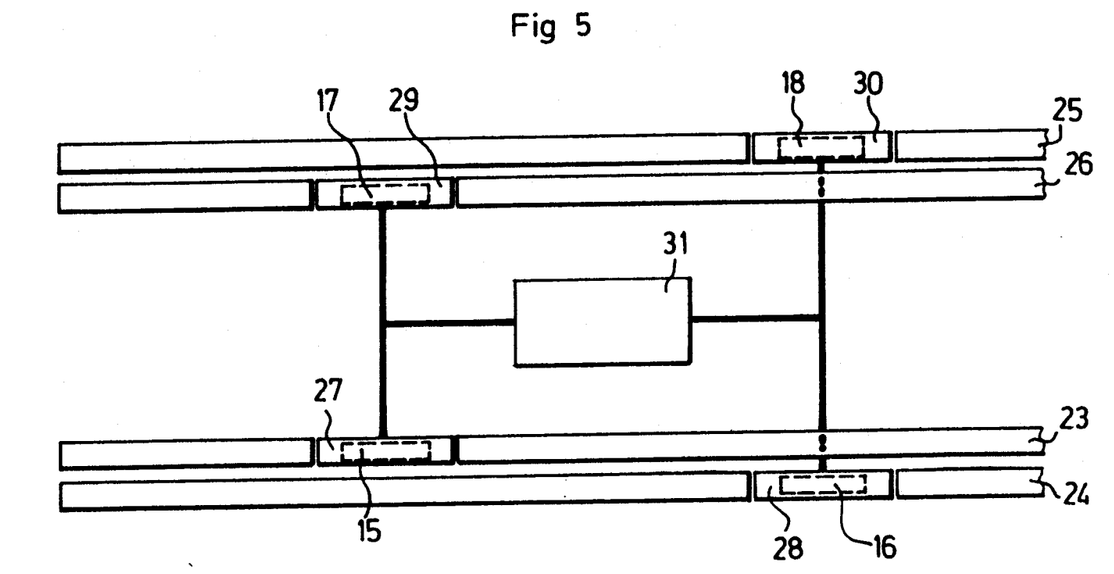
FIG. 5 is a diagrammatic top view of the weighing means of this conveyor device.
Figure 6:
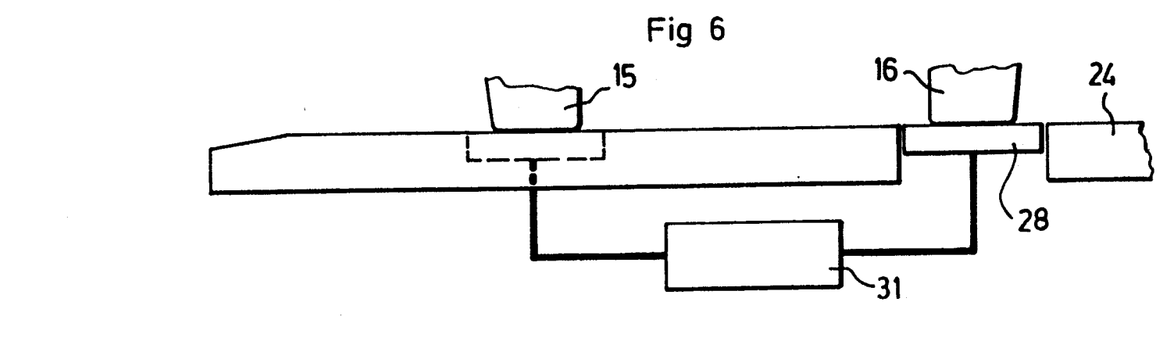
FIG. 6 is a diagrammatic side view of these weighing means.

As shown in FIGS. 5 and 6, this weighing station comprises four slideways 23, 24, 25, 26 extending parallel to the conveyor so that they are each in the alignment of one of the support shoes 15, 16, 17, 18 of the carriages 8.

These slideways 23-26 comprise an access ramp which makes it possible to cause an upward displacement of the carriages 8 with respect to the chassis 3 so that these carriages 8 move on these slideways while being driven in a floating manner.

Each of these slideways 23-26 further comprises a weighing zone 27-30, the latter being disposed so as simultaneously to support the support shoes 15-18 of the carriages 8. These weighing zones are connected to a weighing unit 31 in a known manner so as to allow an accurate detection of the weight of the carriages 8 and the products borne by the pair of rollers 19 of these carriages.

The conveyor device also comprises discharge stations allowing the evacuation of the products borne by the carriages 8, for instance to auxiliary conveyors, as a function of predetermined selection criteria.

Figure 1:
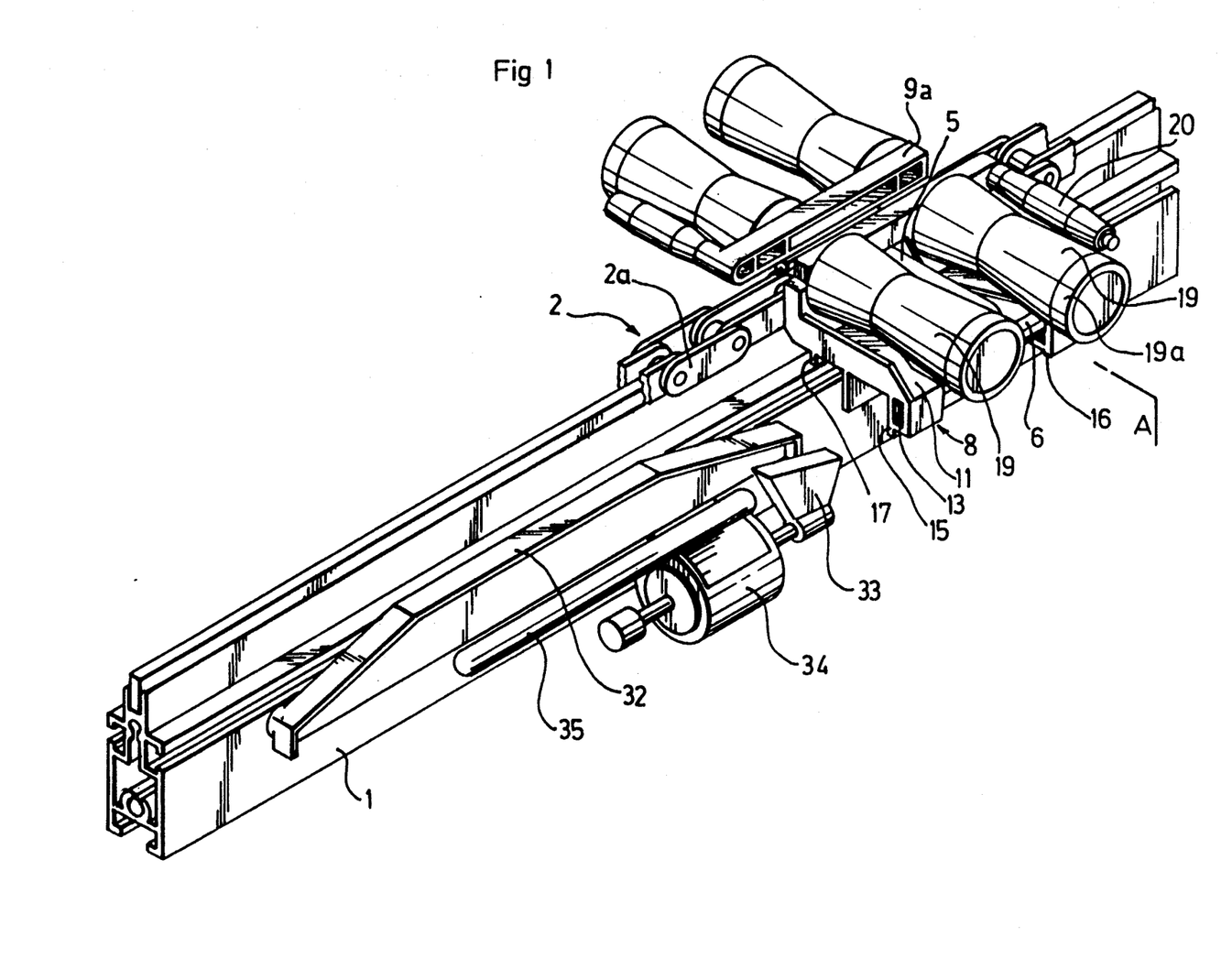
FIG. 1 is a perspective view of a section of the conveyor device of the invention.
Figure 2:
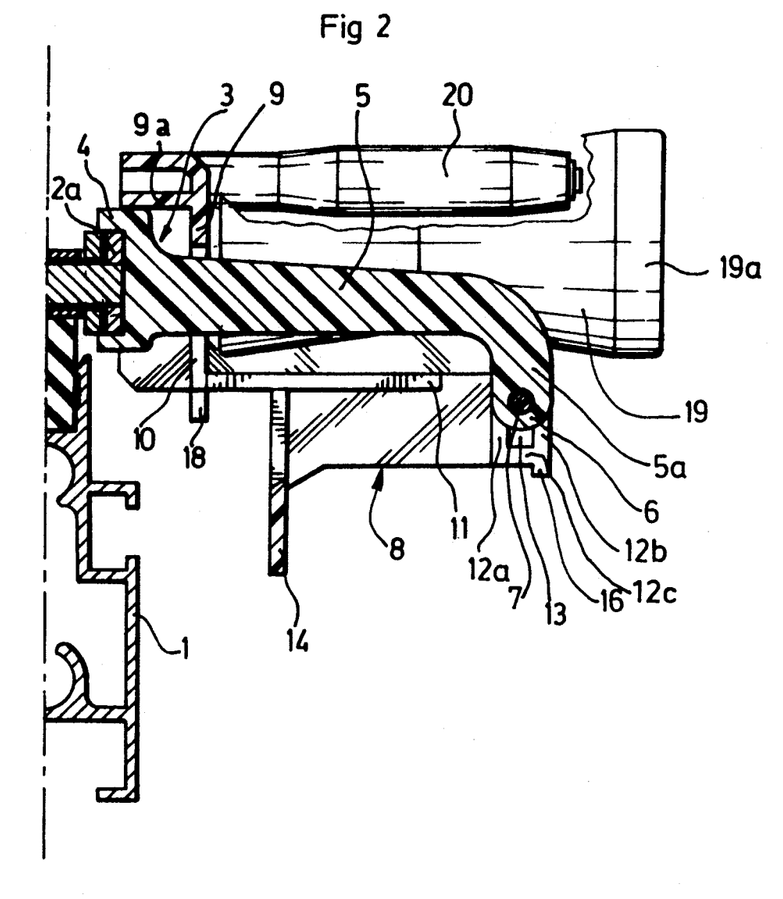
FIG. 2 is a cross-section through a vertical plane A of FIG. 1.
Figure 3:
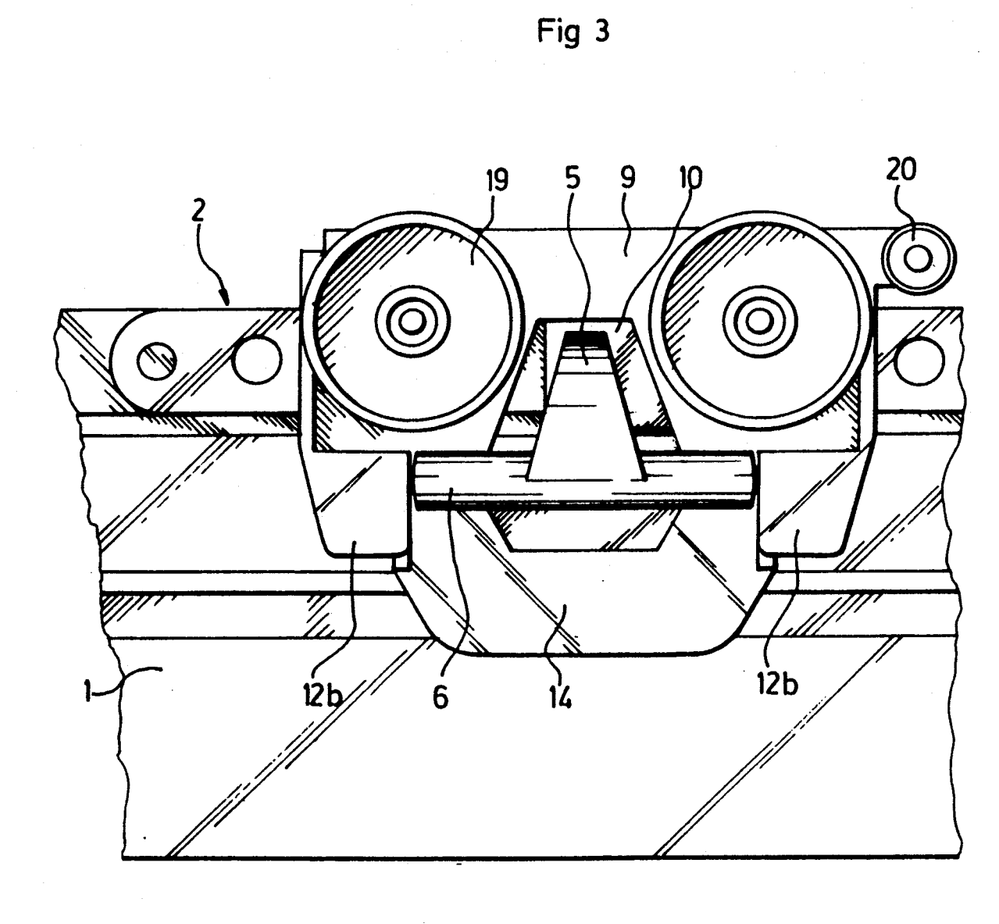
FIG. 3 is a partial side view.
Figure 7:
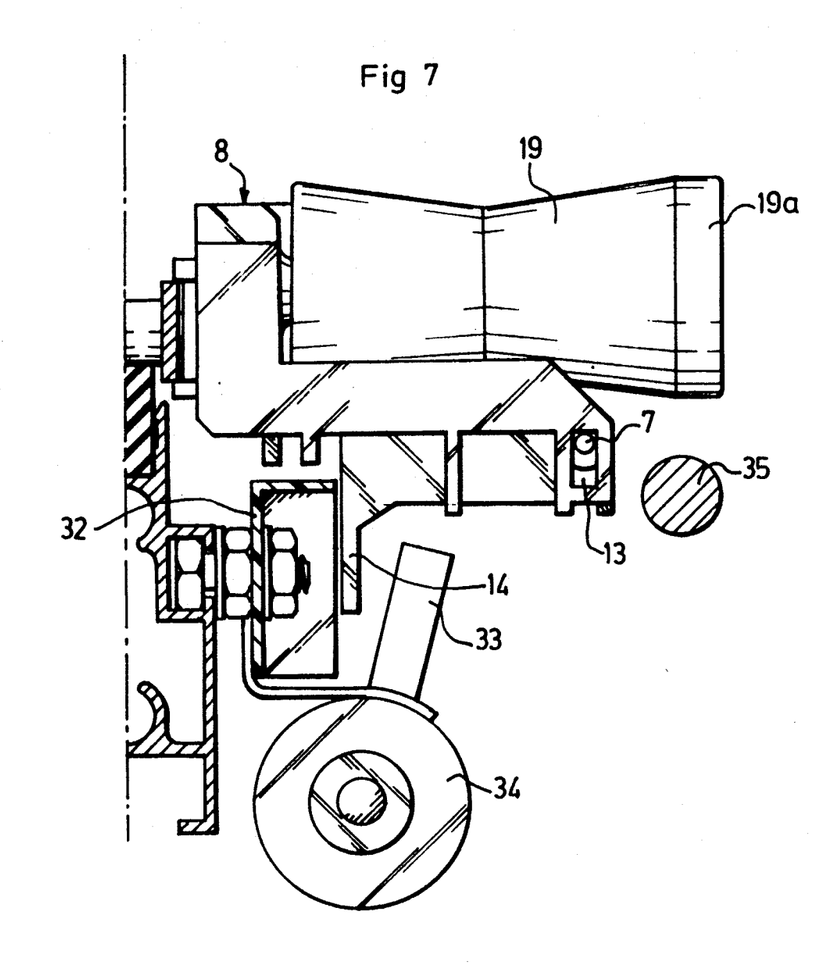
FIG. 7 is a cross-section through a vertical plane showing the discharge means of the carriages in their passive position.
Figure 8:
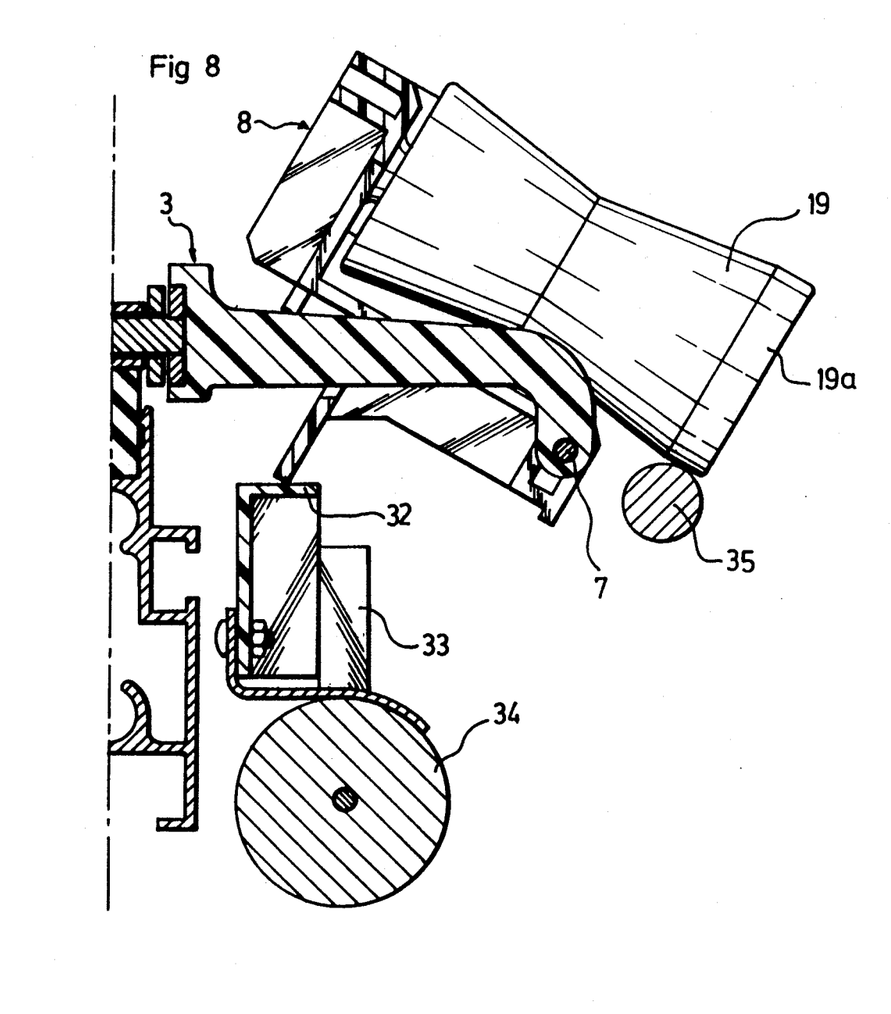
FIG. 8 is a cross-section through a vertical plane showing the discharge means of the carriages in their active position.

As shown in FIGS. 1, 7 and 8, each switching station comprises a cam 32 fixed laterally to the profiled section 1 so as to extend parallel thereto. As shown in FIG. 7, the cam 32 is also disposed such that the lug 14 of the carriages 8 passes laterally along the cam when the switching means are not actuated.

This cam 32 lastly has a horizontal upper sliding surface extending at each end by a descending inclined ramp whose lower apex is disposed in the same horizontal plane as the lower surface of the lugs 14 of the carriages 8.

Each switching station further comprises a lever 33 having an upper surface combined with the access ramp of the cam 32. This lever 33 is secured on the axis of rotation of an electromagnet 34 adapted to cause it to pivot between two positions: a passive position in which it is spaced from the cam 32 and in which it allows the passage of the lugs 14 of the carriages 8 and an active position in which it is coupled to the cam 32 and forms an obstacle to the passage of the lugs 14 causing the diversion of these lugs towards the access ramp of the cam 32.

In the active position of the switching means, the lug 14 of the carriages 8 is thus caused to slide on the cam causing the lateral tilting of these carriages and thus the discharge of the products borne thereby.

As shown in FIG. 8 and in order to facilitate the dropping of these products, each switching station is also provided with a horizontal support tube 35 disposed parallel to the conveyor such that the cylindrical section 19a of the rollers bears on this tube. The rollers 19 are thus caused to rotate about their axis of rotation and the products are more readily evacuated.

The conveyor device lastly comprises, in a known manner, means such as a centralized management unit adapted in particular to locate the position of each product being transported along the conveyor, to generate signals representative of the weight of these products detected at the weighing station, to compare these signals with predetermined parameters and to control the actuation of the corresponding switching means.

This conveyor device may also be provided with any known means allowing sorting of the products as a function of their external appearance.

I claim:

1. A conveyor device for products, in particular fruit, adapted to sort these products as a function of predetermined selection criteria, of the type comprising:

a conveyor (1, 2) for transporting the products provided with a loading zone (21) for these products, a plurality of rollers (19) rotating freely about their axes, distributed along the conveyor (1, 2) and disposed transversely with respect to the direction of movement of the conveyor so that two successive rollers (19) bound a housing for a product between one another, support means (3, 8) for the rollers (19) adapted to allow oscillation in a vertical plane and lateral tilting of these rollers, weighing means (23-31) adapted to allow the weight of the products supported by the rollers (19) to be ascertained, tilting means (32-34) adapted selectively to cause the tilting of two successive rollers so as to discharge the product disposed between these rollers, this conveyor device being characterized in that:

the support means for the rollers (19) comprise:

a plurality of chassis (3) distributed along the conveyor (1, 2) and comprising a horizontal axis (6) extending parallel to the conveyor, supported by each chassis (3), a carriage (8) bearing two rollers (19) bounding a housing for a product between one another, each of these carriages:
being mounted on the axis (6) of a chassis (3) so as to be able to oscillate vertically and tilt laterally with respect to this chassis,
comprising support shoes (15-18) bounding at least one horizontal sliding plane;

the weighing means comprise slideways (23-26) each disposed in the alignment of a support shoe (15-18) of the carriages (8), these slideways being provided with an end ramp adapted to cause an upward movement of the carriages (8) with respect to their chassis (3), and weighing zones (27-31) for the carriages, separation means (20, 22) are adapted to carry out, at the product loading zone (21), an ordered arrangement of the products making it possible to dispose each of them on a carriage (8).

2. A conveyor device as claimed in claim 1, characterized in that:

the conveyor (1, 2) extends, at its loading zone, in the form of an ascending inclined ramp (21), the separation means comprise:

for each carriage (8), an intermediate roll (20) parallel to the rollers (19) and disposed so as to extend between the pairs of rollers (19) of two successive carriages (8), means (22) for driving the rollers (19) in rotation disposed along the loading zone (21) and adapted to drive these rollers in rotation in the direction opposite to the direction of movement of the conveyor (1, 2) with a linear speed of rotation greater than that of the conveyor.

3. A conveyor device as claimed in claim 2, characterized in that the means driving the rollers (19) in rotation comprise an endless belt (22) arranged to come into contact with these rollers.

4. A conveyor device as claimed in claim 3, characterized in that each roller (19) has a concave biconical shape and comprises an end section (19a) of cylindrical shape arranged to bear on the endless belt (22).

5. A conveyor device as claimed in claim 1, characterized in that:

each chassis (3) comprises a plate (4) adapted to be secured laterally to the conveyor (1, 2) and a substantially horizontal support arm (5) extending at right angles to the plate and bearing a horizontal axis (6) parallel to the conveyor (1, 2), which axis comprises a tappet (7) at each end, each carriage (8) comprises a plate (9) having a recessed rear surface forming an upper rim via which it bears on the plate (4) of the chassis (3), and two substantially horizontal crossbars (11) extending at right angles to the plate, below each of which there is disposed an oblong window (13) with a major vertical axis adapted to house a tappet (7).

6. A conveyor device as claimed in claim 5, characterized in that it comprises two sets of chassis (3) secured facing one another on either side of the conveyor (1, 2).

7. A conveyor device as claimed in claim 1, characterized in that:

each carriage (8) comprises four support shoes (15-18) distributed laterally and longitudinally under this carriage, the shoes being offset transversely with respect to one another, the weighing means comprise four slideways (23-26) each disposed in the alignment of a shoe (15-18), these slideways being provided with weighing zones (27-30) disposed so as simultaneously to support the support shoes.

8. A conveyor device as claimed in claim 1, characterized in that the tilting means comprise:

a cam (32) provided with an access ramp and disposed parallel with respect to the conveyor (1, 2), for each carriage (8), a lug (14) projecting below this carriage and arranged to pass laterally along the cam (32), switching means (33, 34) adapted to divert the path of the lugs (14) of the carriages (8) and bring them to the access ramp of the cam (32).

9. A conveyor device as claimed in claim 8, characterized in that it comprises a support member (35) disposed parallel to the cam (32) so that the end (19a) of the rollers (19) bears on this member when the carriages (8) are tilted by the cam.

10. A conveyor device as claimed in claim 8, characterized in that the switching means comprise a lever (33)

provided with an upper surface combined with the access ramp of the cam (32) and means (34) for pivoting this lever between a position in which it is spaced from the cam (32) so as to allow the passage of the lugs (14) of the carriages (8) and a position in which it is coupled to the cam (32) in the path of these lugs.

11. A conveyor device as claimed in claim 10, characterized in that the pivoting means comprise an electromagnet (34) provided with an axis of rotation bearing the lever (33).

12. A conveyor device for products, in particular fruit, of the type comprising:
   a conveyor (1, 2) for transporting the products provided with a loading zone (21) for these products,
   a plurality of rollers (19) freely rotating about their axes distributed along the conveyor (1, 2) and disposed transversely with respect to the direction of movement of the conveyor so that two successive rollers (19) bound a housing for a product between one another,
this conveyor device being characterized in that the conveyor (1, 2) extends, at its loading zone, in the form of an ascending inclined ramp (21) and in that it comprises means for separating the products comprising:
   between each pair of roller (19), an intermediate roll (20) parallel to the rollers (19) and disposed so as to extend between these pairs of rollers (19),
   means (22) for driving the rollers (19) in rotation disposed along the loading zone (21) and adapted to drive these rollers in rotation in the direction opposite to the direction of movement of the conveyor (1, 2), with a linear speed of rotation greater than that of the conveyor.

* * * * *